No. 843,905. PATENTED FEB. 12, 1907.
A. H. MEYER.
COOKING UTENSIL.
APPLICATION FILED DEC. 11, 1905.

2 SHEETS—SHEET 1.

Witnesses,
W. H. Palmer
Emily F. Otis

Inventor,
Albert H. Meyer.
by Lothrop Johnson
his Attorneys.

No. 843,905. PATENTED FEB. 12, 1907.
A. H. MEYER.
COOKING UTENSIL.
APPLICATION FILED DEC. 11, 1905.

2 SHEETS—SHEET 2.

Witnesses,
W. H. Palmer
Emily F. Otis

Inventor,
Albert H. Meyer.
by Lothrop Johnson
his Attorneys.

UNITED STATES PATENT OFFICE.

ALBERT H. MEYER, OF ST. PAUL, MINNESOTA.

COOKING UTENSIL.

No. 843,905.         Specification of Letters Patent.         Patented Feb. 12, 1907.

Application filed December 11, 1905. Serial No. 291,187.

*To all whom it may concern:*

Be it known that I, ALBERT H. MEYER, a citizen of the United States, residing at St. Paul, in the county of Ramsey and State of Minnesota, have invented certain new and useful Improvements in Cooking Utensil, of which the following is a specification.

My invention relates to improvements in cooking and boiling utensils, its object being to provide improvements in the construction by which the heat is conserved and a great saving of fuel effected.

To this end my invention consists in the features of construction and combination herein after particularly described and claimed.

Figure 1:
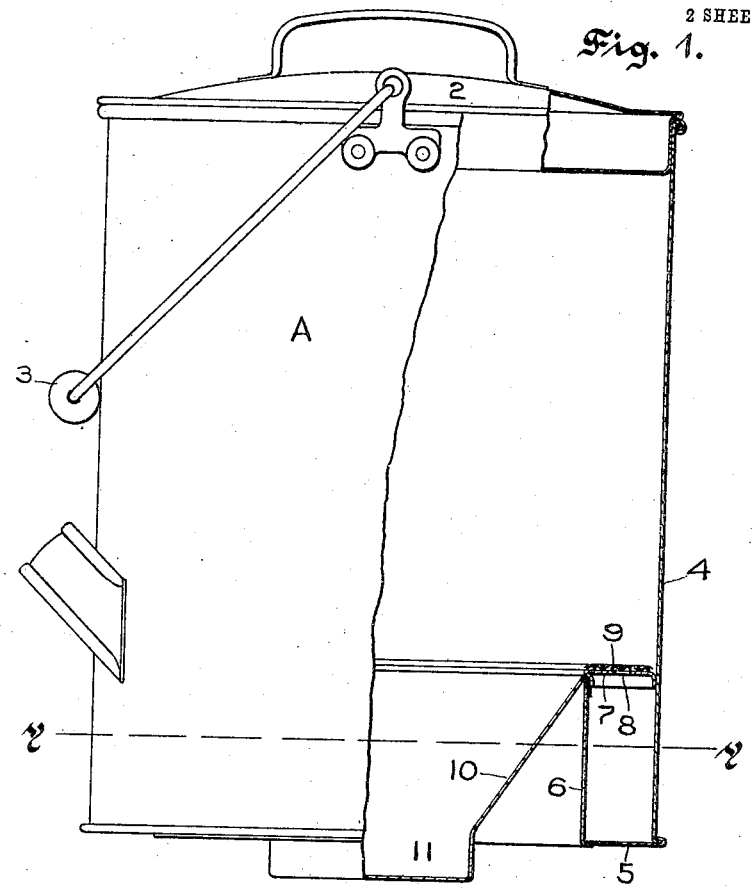
Figure 2:
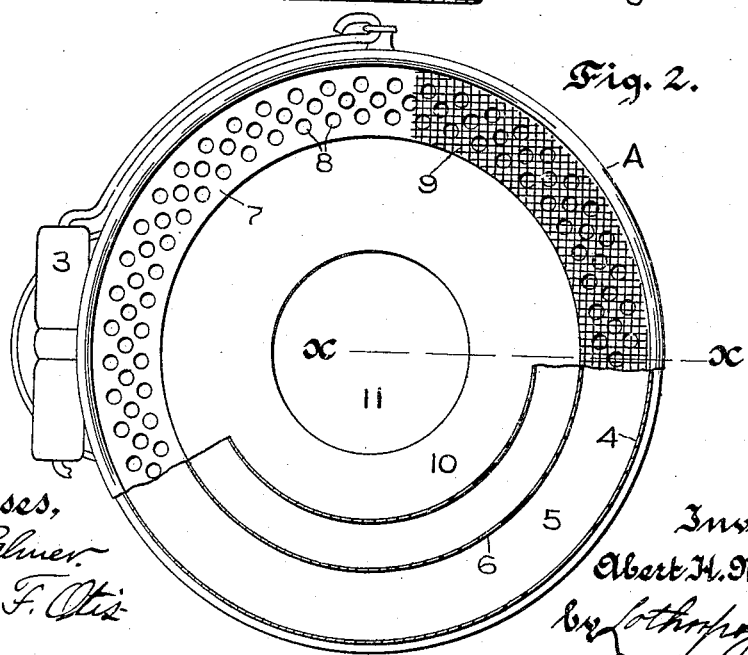
Figure 3:
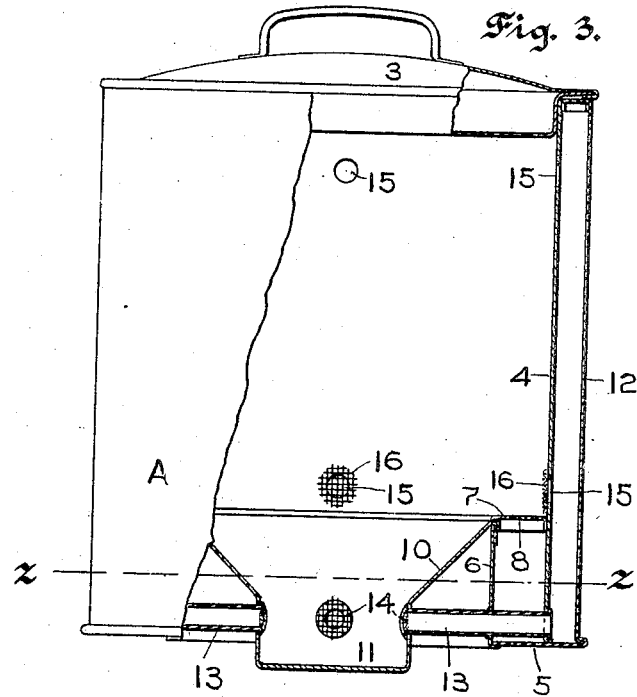
Figure 4:
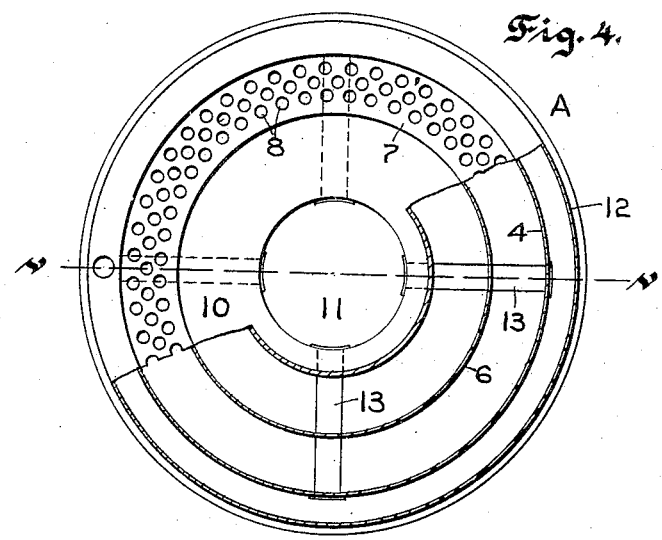

In the accompanying drawings, forming part of this specification, Figure 1 is a side elevation of one form of my invention shown in section on line *x x* of Fig. 2. Fig. 2 is a plan view with the cover removed and sectioned on line *y y* of Fig. 1. Fig. 3 is a side elevation of another form of my invention shown in section on line *v v* of Fig. 4, and Fig. 4 is a plan view with the cover removed and sectioned on line *z z* of Fig. 3.

In the drawings, A represents a cooking-pot constructed of sheet metal or other suitable material and provided with a cover 2 and handle 3.

Connected with the lower end of the outer wall 4 by a rim 5 is an upwardly-extending inner wall 6. The top of the well formed by the outer and inner walls 4 and 6 is closed by a detachable ring 7, provided with perforations 8 and preferably covered by meshing 9. Extending inwardly and downwardly from the top of the inner wall 4 is a bottom 10, preferably funnel-shaped, having a central well portion 11 extending below the bottom wall 5.

In use the pot will be supported over the burner of the stove in the ordinary manner, the bottom of the well 11 extending into close proximity to the flame. The flame will thus surround the funnel-bottom, concentrating its heat in the space between the side wall of said bottom and the opposite inner side wall 6 instead of passing from under the bottom of the pot as in the ordinary construction. The water within the space between the walls 4 and 6 and in the funnel-bottom will thus be quickly brought to the boiling-point. The water from the pot will pass through the perforations 8 into the space between the inner and outer walls 4 and 6. It will therefore be evident that my improved form of pot conserves the heat that with the ordinary pot is wasted by the flame passing from under the bottom of the pot.

My features of improvement may be embodied in any vessel which is used over a flame and may be changed in shape and nonessential features to conform to the different constructions of ranges, &c.

In use the rim 5 rests upon the stove and the lower end of the funnel-shaped bottom extends into close proximity to the flame.

In the form shown in Figs. 3 and 4 the vessel is inclosed by a second outer wall 12, interspaced from the side wall 4 to form an intermediate water-jacket. The space between the walls 4 and 12 is connected at its lower end by a series of tubes 13 with the central funnel-shaped bottom. The inner ends of the tubes 13 preferably have meshing coverings 14. The wall 4 is also shown with openings 15, the lower ones of which may be covered with meshing 16. The addition of the water-jacket (shown in Figs. 3 and 4) will increase the effectiveness of the construction. The tubes 13, as will be noted, cause a larger amount of heating-surface to be presented to the flame.

I claim—

1. A utensil of the class described comprising an outer wall, an inwardly-extending rim secured to the lower end of said outer wall, a comparatively short inner wall extending upwardly from the inner edge of said rim, and a funnel-shaped bottom extending downwardly from the upper edge of said inner wall.

2. A utensil of the class described provided at its lower end with double interspaced side walls, a perforated partition connecting the top of said inner side wall with the outer wall, and a bottom portion within said inner wall terminating in a well extending below the lower ends of said walls.

3. A utensil of the class described comprising double side walls at its lower end, a funnel-shaped bottom extending downwardly from the upper end of said inner wall, and a water-jacket surrounding said outer wall and communicating with the space inside said inner wall.

4. A utensil of the class described comprising in combination an outer wall, an inwardly-extending rim secured to the lower end of said wall, an inner wall extending upwardly from the inner edge of said rim, a funnel-shaped bottom extending downwardly from the upper end of said inner wall, and a perforated ring connecting the upper end of said inner wall and said outer wall.

5. A utensil of the class described, comprising an outer wall, an inwardly-extending rim secured to the lower end of said wall, a wall extending upwardly from the inner edge of said rim, a funnel-shaped bottom extending downwardly from the upper end of said inner wall and terminating in a central well depending below said rim, and an open-work horizontal wall connecting the upper end of said inner wall with said outer wall.

6. A utensil of the class described, having at its lower end double side walls, a bottom extending inwardly and downwardly from the upper edge of said inner wall, a water-jacket surrounding said outer wall, and conduits connecting said water-jacket with the space within the inner wall.

In testimony whereof I affix my signature in presence of two witnesses.

ALBERT H. MEYER.

Witnesses:
H. S. JOHNSON,
EMILY F. OTIS.